United States Patent [19]

Janssen et al.

[11] Patent Number: 5,471,827
[45] Date of Patent: Dec. 5, 1995

[54] DEVICE FOR THE AUTOMATIC SELECTIVE HARVESTING OF MUSHROOMS

[75] Inventors: Joseph J. J. Janssen, Veldhoven; Josephus J. H. van Nunen, Sint Oedenrode; Marc M. J. L. Giebels, Geldrop, all of Netherlands

[73] Assignee: CCM Beheer B.V., Netherlands

[21] Appl. No.: 170,271

[22] PCT Filed: Jul. 9, 1992

[86] PCT No.: PCT/NL92/00124

§ 371 Date: Jan. 4, 1994

§ 102(e) Date: Jan. 4, 1994

[87] PCT Pub. No.: WO93/00793

PCT Pub. Date: Jan. 21, 1993

[30] Foreign Application Priority Data

Jul. 9, 1991 [NL] Netherlands ............................. 9101205

[51] Int. Cl.⁶ ............................. A01D 45/00; A01D 46/24
[52] U.S. Cl. ............................................. 56/13.1; 56/327.1
[58] Field of Search ............................. 56/10.2 R, 327.1, 56/13.1, 328.1

[56] References Cited

U.S. PATENT DOCUMENTS

| | | | |
|---|---|---|---|
| 3,183,640 | 5/1965 | Gee et al. | 53/498 |
| 3,460,330 | 8/1969 | Black | 56/328.1 |
| 3,913,307 | 5/1975 | Cardinal, Jr. | 56/13.1 X |
| 4,425,751 | 1/1984 | Bousseau et al. | 56/327.2 |
| 4,482,960 | 11/1984 | Pryor | 364/424.2 |
| 4,519,193 | 5/1985 | Yoshida et al. | 56/328.1 |
| 4,524,573 | 6/1985 | Kinney | 56/330 |
| 4,532,757 | 8/1985 | Tuttle | 56/328.1 |
| 4,718,223 | 1/1988 | Suzuki et al. | 56/328.1 |
| 4,843,561 | 6/1989 | Larson | 364/478 |
| 4,873,644 | 10/1989 | Fuhjii et al. | 364/478 |
| 4,975,016 | 12/1990 | Pellenc | 414/501 |

FOREIGN PATENT DOCUMENTS

| | | |
|---|---|---|
| 0053994 | 6/1982 | European Pat. Off. . |
| 0100207 | 2/1984 | European Pat. Off. . |
| 0270469 | 6/1986 | European Pat. Off. . |
| 0428284 | 5/1991 | European Pat. Off. . |
| 2045318 | 5/1971 | France . |
| 2531604 | 2/1984 | France . |
| 2588719 | 4/1987 | France . |
| 2638599 | 5/1990 | France . |
| 3036116 | 5/1982 | Germany . |
| 6814542 | 4/1970 | Netherlands . |
| 8501733 | 1/1987 | Netherlands . |
| 8600887 | 11/1987 | Netherlands . |
| 1336393 | 11/1973 | United Kingdom . |
| 2155747 | 10/1985 | United Kingdom . |
| 2243526 | 4/1987 | United Kingdom . |
| 9111902 | 8/1991 | WIPO . |
| 93/16582 | 9/1993 | WIPO . |

*Primary Examiner*—David J. Bagnell
*Attorney, Agent, or Firm*—Henderson & Sturm

[57] ABSTRACT

A device for the automatic selective harvesting of mushrooms grown on a growing bed that includes: at least one camera for observing the mushrooms on the growing bed; a carrier which is movable above the growing bed relative thereto, and is provided with apparatus for positioning one or more picking heads for picking mushrooms on the basis of information coming from each camera; wherein the picking heads each have a deformable suction cup which is connected to a controllable source of reduced pressure for fixing by suction the cap of a mushroom against the suction cup and wherein each suction cup is rotatable through a certain angle for detaching the mushroom held by suction on the suction cup from the growing bed and wherein the picking head includes a torsionally essentially rigid, laterally flexible coupling member for interconnecting the suction cup with the positioning apparatus.

22 Claims, 5 Drawing Sheets

DEVICE FOR THE AUTOMATIC SELECTIVE HARVESTING OF MUSHROOMS

Device for the automatic selective harvesting of mushrooms grown on growing beds, comprising: a carrier which is movable above a growing bed relative thereto, and is provided with picking means for picking the mushrooms; at least one camera for observing the mushrooms on the growing bed; positioning means for positioning the picking means on the basis of information coming from each camera; the picking means comprising one or more picking heads each having a suction element provided with an opening which can be connected to a controllable source of reduced pressure for fixing by suction the cap of a mushroom against the suction element, each suction element being rotatable through a certain angle for detaching the mushroom held by suction on the suction element from the growing bed.

Nowadays mushrooms are largely grown on elongated growing beds, with a number of growing beds being disposed one above the other in racks with a small space between them, in order to utilize the growing space as efficiently as possible, and to minimize the floor area required for the cultivation. On the other hand, mushrooms may be cultivated in boxes.

Many operations necessary for cultivating mushrooms have already been mechanized with the passage of time, and can consequently be performed more economically than before. For the harvesting of mushrooms, in particular mushrooms for fresh consumption, developments with a view to the mechanization of picking have also been carried out, different devices having been proposed. These devices may be movable above a stationary growing bed, or the growing bed may be moved relative to a stationary device.

A mushroom harvesting device is known from Dutch Patent Application 86/00887. This publication describes a picking device with one or more picking heads which, with the aid of the information obtained by the cameras, are positioned above the center of the mushrooms to be picked. A sensor then measures the distance between the underside of the picking head and the upper side of a mushroom, following which the picking head is lowered over approximately this distance and air is pumped into an inflatable edge around a picking opening of a picking head. The picking head thereby comes into contact with the upper side of the cap of the mushroom, which can be harvested after its cap is fixed by suction to the picking head and the picking head with the mushroom fixed to it is rotated about a vertical axis through a certain angle.

Such a device has a number of disadvantages.

In the first place, the picking head of the known picking device fitted on the carrier can be moved only in the vertical direction and rotated about a vertical axis. The means for moving the picking head in a plane parallel to the surface of the growing bed comprise only the carrier which can generally be moved only along a straight line, with the result that a large number of picking heads must be used in order to cover the whole growing bed. Nevertheless, in the worst case it is only possible to pick with one picking head at a time, namely when only one picking head can be positioned by a suitable movement of the carrier above a mushroom to be harvested. The other picking heads are not effective in this case. The picking capacity of such a device will consequently generally fail relative to manual picking. The large number of picking heads required for a reasonable harvesting result also makes the device and the control thereof complex and expensive.

Secondly, the lower edge of the picking head always lies in the horizontal plane, with the result that with the known device caps of mushrooms standing obliquely often cannot be fixed by suction well, if at all, to the picking head, or there is a risk of the mushrooms being damaged during picking, the cap of the mushroom breaking off its stalk, or the stalk being forced through the cap by the pressure exerted by the inflatable edge around the picking opening of a picking head. In this situation problems are encountered further in twisting mushrooms fixed on the picking head loose in the ground prior to harvesting them, since the axis of rotation of the picking head and the axis of the mushroom stalk are not in line with each other, and both the growing bed and the mushroom can therefore be seriously damaged during harvesting.

Further problems which have to be solved in the automatic harvesting of mushrooms relate to the very limited available construction height for a mushroom harvesting device, which has to be capable of working between two growing beds lying above one another, and to the finishing processing, discharge and collection of the picked mushrooms. Given the fact that a mushroom is very sensitive to forces acting upon its surface, which can give rise to local discoloration and reduce the value of the mushroom or make it unsuitable for fresh consumption, the number of handling operations on a picked mushroom must be limited as much as possible. Operations which a mushroom has to undergo in any case after picking in the abovementioned way are cutting off part of the base of the stalk and removing the mushroom from the picking device to a collection point for packing and dispatch.

A number of the disadvantages described above are eliminated in the mushroom harvesting device described in EP-A-0 428 284. The picking heads illustrated in this publication can be positioned in two directions at right angles to each other above a mushroom growing bed, on the one hand by a movement in the longitudinal direction of the growing bed relative to the more or less stationary picking device, and on the other hand by a movement in the transverse direction of the picking heads along guide rails of the picking device. The picking heads can be moved only in the vertical direction and rotated about a vertical axis.

The device comprises different conveyor belts for the discharge of picked mushrooms and the discharge of cut-off stalk bases, which conveyor belts are disposed with their lengthwise direction parallel to the direction of movement of the growing bed relative to the picking device. The picking heads therefore have to cover relatively large distances in order to discharge the mushrooms and the stalk bases, which takes a long time and lowers the picking efficiency.

Cutting means, comprising a rotary cutter or scissor-type cutters, are disposed above the conveyor belt for the discharge of cut-off stalk bases. However, such cutting means generally lead to an irregular and therefore unattractive cut face on the underside of the stalk of a mushroom. With the use of such cutting means there is also a great risk of the stalk of the mushrooms breaking or tearing. Mushrooms growing obliquely will be picked obliquely, and consequently also the stalk bases will be cut obliquely, which leads to an unattractive appearance.

Prior to picking of the mushrooms, a complete picture of the growing bed is taken by means of a camera in a fixed position. This requires an extensive image memory, while it must also be known exactly where the picking device is in relation to the growing bed, in order to be able to drive the picking heads with the aid of the image information to the desired positions. For the best picking results, the picking heads must be kept practically stationary during their picking action, since time is needed to fix a mushroom cap by suction and the picking heads practically have no lateral flexibility. This again lowers the picking efficiency.

An object of the invention is to eliminate the abovementioned disadvantages and to provide a device for selectively harvesting mushrooms, which can achieve a large picking capacity with a limited number of picking heads.

Another object of the invention is to provide a mushroom harvesting device by means of which not only mushrooms which are standing straight, but also mushrooms with the caps at an angle can be picked in a reliable way.

Yet another object of the present invention is to provide a mushroom harvesting device in which the base is cut automatically from the stalk of a mushroom quickly and with the minimum number of handling operations, following which the mushroom and the cut-off base are automatically discharged separately from each other and collected.

For this purpose, the invention provides a device for the selective harvesting of mushrooms, which device is characterized in that the suction element is coupled to the corresponding picking head by means of a torsionally rigid, laterally flexible coupling member. Such picking means greatly improve the performance of the mushroom harvesting device, while the suction element can adapt its orientation to any oblique orientation of a mushroom cap by the lateral flexibility of the coupling member, thereby providing a certain fixation by suction of the mushroom cap to the picking head. The torsional rigidity of the coupling member allows the mushrooms to be twisted loose from the growing bed after their fixation to the picking head. This twisting can be brought about by rotating only the suction element relative to the coupling member, or by rotating the picking head as a whole. The axis of rotation of the picking head will always be in line with the axis of the mushroom stalk, which provides optimum conditions for undamaged harvesting of the mushrooms and straight cutting of the stalk bases. The lateral flexibility of the coupling member further allows the picking heads to move continuously over the growing bed during the harvesting in spite of the fixing of the mushroom caps by suction taking some time: the suction element will remain on the stationary mushroom cap while the picking head moves along with the carrier to which it is connected.

In a preferred embodiment the coupling member consists of a bellows. Aparts from its torsinal rigidity and its lateral flexibility, a bellows provides a self-adjusting height setting by lowering a suction element having a specific weight and being connected to the bellows, on a mushroom cap. For this lowering, the length of the bellows may be varied passively or actively. The latter way of control, e.g. by pneumatic means, provides an accurate control of position and speed of the suction element, in particular in removing a mushroom fixed by suction to the suction element from the growing bed, by drawing the air from the bellows. Advantageously, the torsional rigidity of the bellows can be improved by providing reinforcements in the folds of the bellows.

Although many embodiments of the coupling member are conceivable, among which articulated constructions or a plurality of universal joints, preference is given to resilient members which in view of the positioning reproduceability of the suction element have no lateral hysteresis, such as the afore-mentioned bellows, a helical spring or a helical spring which is integrated with a tube made of a flexible material. The latter coupling member can also be connected to a source of reduced pressure, in particular for retracting the member.

For an optimum grip of the suction element on the cap of a mushroom the suction element preferably is provided with an annular pad consisting at least partially of a flexible envelope filled with a deformable filling material. Such an annular pad can adapt its form to the particular form of the cap of a mushroom to be picked, which on the one hand provides sufficient friction between the suction element and the mushroom cap to be able to twist the mushroom out of the growing bed, while on the other hand the cap is not damaged in this operation. The envelope material should be selected such that no dirt adheres to it.

In a preferred embodiment, the filling material is a resilient porous material with an open cell structure. In this case, the envelope will generally be closed, only a small opening leading to the atmosphere for ventilation. The annular pad resumes its original form when there are no external forces acting upon it.

In another preferred embodiment the filling material is a granular material, e.g. sand. When the annular pad has taken the form of a mushroom cap, this form can be retained by evacuating the envelope, after which the pad will be rigid enough to transfer the torque necessary to twist the mushroom out of the growing bed.

In a further preferred embodiment the filling material of the annular pad is an electro-viscous material, which by selecting a suitable excitation can be made to act in a similar way as the granular material by varying the viscosity: low when the suction element is put on a mushroom cap, and high when the mushroom is twisted out of the growing bed.

The best adaptation of the annular pad to mushroom caps with different surface forms and orientations is reached by rounding the annular pad at the side facing the cap of the mushroom, the radius of the cross-section at the interior side being larger than the radius of the cross-section at the exterior side.

Advantageously, the picking means of the device for the selective harvesting of mushrooms comprises one or more picking arms, one end of which bears the picking head, which can be moved by the picking arm both in a horizontal plane, essentially transversely to the direction of movement of the carrier relative to the growing bed, and in a vertical plane between an initial position and a picking position, between which positions a cutting device can cut off the base of the stalk of a picked mushroom. The use of picking arms permits a compact, light picking device which requires little space in the vertical direction, and which can be used in situations with stationary growing beds and moving picking means, in situations with moving growing beds and stationary picking means, and in situations in which both growing bed and picking device move.

A picking arm advantageously forms part of a four-rod mechanism set up in a vertical plane and having four pivot points forming the corner points of a parallelogram, which mechanism pivots about a vertical shaft through a predetermined angle. Such a mechanism makes a combined horizontal and vertical movement in a vertical plane possible between the initial position and the picking position, while the picked mushroom or a part thereof can be discharged directly above the growing bed with the aid of suitable conveyor means.

The four-rod mechanism can pivot with a vertical shaft through a predetermined angle. This angle can be fairly small through placing several arms next to each other, which enables the picking device to pick at high speed.

A particularly reliable and reproducible cutting action is obtained by fitting the cutting device near the picking head at the end of the picking arm.

The cutting device preferably comprises an elongated cutter which can be moved in a horizontal plane through a predetermined angle about one end of the cutter. The elongated cutter can cut off the base from the stalk of a mushroom in a rapid movement, while a regular cut face is obtained without the risk of the stalk of the mushroom breaking or tearing.

The provision of means for moving the carrier relative to the growing bed, each camera being linked to the carrier, means that it will be sufficient to scan only a small part of the growing bed with the camera or cameras, namely the part where the mushrooms are next in line for harvesting. Only a limited image memory is therefore needed. If the movement relative to the growing bed is carried out at a steady speed, position measuring means for measuring the position of the picking device above the growing bed in the direction of movement of the two elements relative to each other are not needed, since this position can be determined simply with the aid of the image taken by the camera and a time measuring element. The actual movement of the carrier over the growing bed can also be measured with the aid of a suitable sensor.

The construction height of the picking device can be very limited, through the fact that each camera is disposed horizontally and, by means of a mirror fixed on the carrier at an angle of 45 degrees relative to the horizontal plane, scans the growing bed line by line at right angles to the direction of movement of the carrier, for positioning of the picking head(s). The image of the part of the growing bed is renewed continuously at the same speed as that of the relative movement of the picking device relative to the growing bed.

As already discussed above, the design of the picking arms permits the use of a conveyor belt disposed below the picking head of a picking arm in its initial position, for the discharge of harvested mushrooms at right angles to the direction of movement of the carrier relative to the growing bed, and a conveyor belt disposed below the picking head of a picking arm in a base cutting position thereof, for the discharge of cut-off stalk bases at right angles to the direction of movement of the carrier relative to the growing bed. In this case a picking arm is preferably bent in a horizontal plane, so that the area within which the base of the stalk of a mushroom is cut off and can fall on the base discharge conveyor belt and the area within which the mushroom is deposited on the mushroom discharge conveyor belt are smaller than they would have been had the arm not been bent. This increases the reliability of operation of the mushroom harvesting device.

The exclusive rights claimed extend over a suction element and picking means, respectively, as described above.

The invention of an example of an embodiment is explained with reference to the drawing, in which:

FIG. 6b shows a side view, partially in cross-section, of the picking arm and the picking head according to FIG. 6a;

Figure 1:
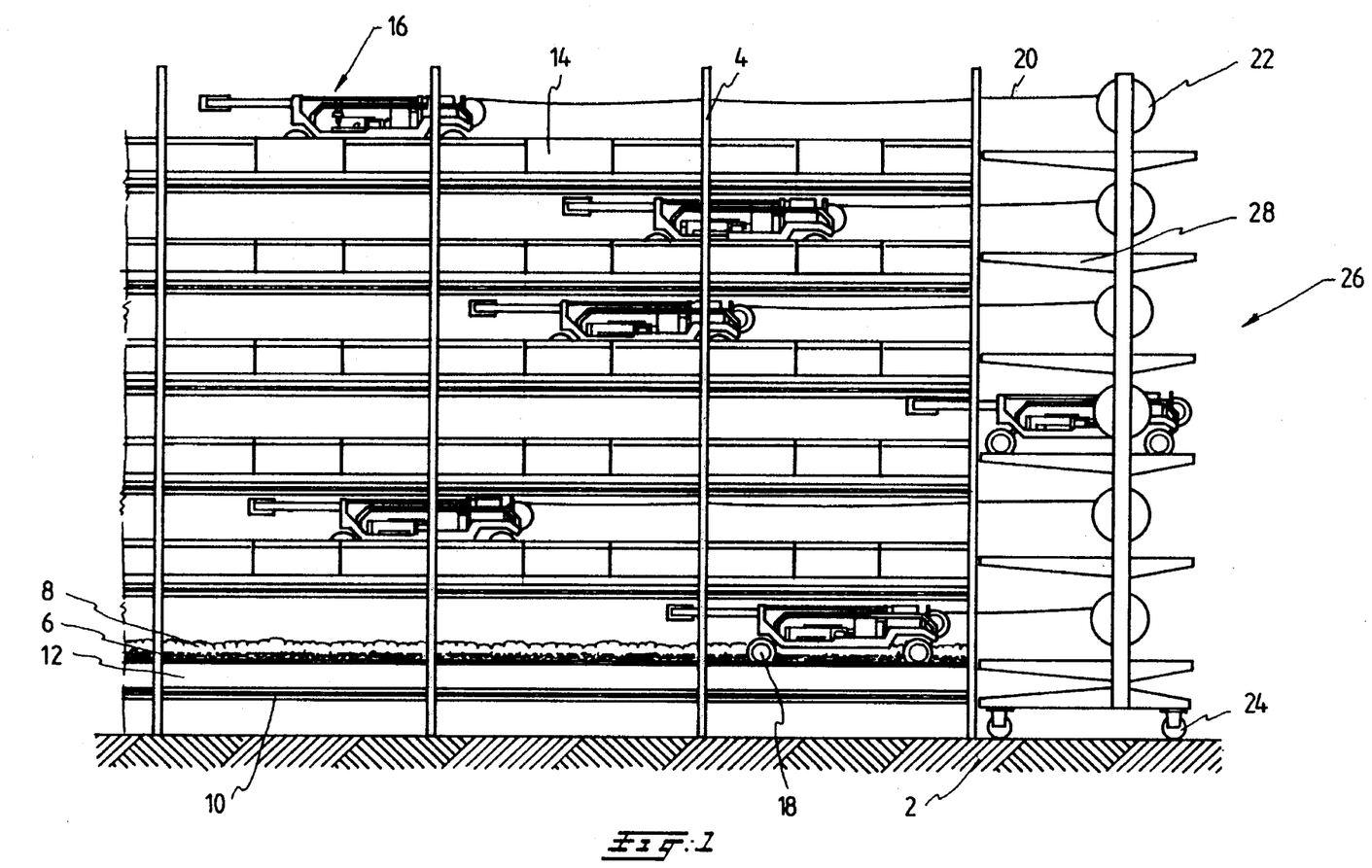
FIG. 1 shows a side view of different devices according to the invention in a rack with mushroom growing beds.

FIG. 1 shows a floor 2, on which a number of frames 4 are placed. These frames are used to support a number—in this case six—of elongated growing beds 6 for mushrooms 8, which beds are placed above one another and are formed in trays comprising a bottom 10 and side boards 12. Boxes 14 are disposed next to the long sides of each growing bed 6, along the side boards 12, in which boxes harvested mushrooms can be collected at one long side, and cut-off stalk bases of the mushrooms at the other long side. For the sake of clarity, the boxes 14 are not shown at the lower growing bed 6. A carriage 16 for the automatic selective harvesting of the mushrooms 8 can be moved along the top edge of the side boards 12, one carriage 16 being used for each growing bed 6. The carriage 16 is provided with flanged wheels 18 and can thus travel along the top edges of side boards 12. The energy required for propelling the carriage 16 and driving the picking means disposed on the carriage is supplied in the form of electrical energy by means of a flexible line 20 to a carriage 16, following which the electrical energy for driving the picking means on the carriage can be converted into a more suitable form of energy, for example vacuum for driving pneumatic control elements. The line 20 can be reeled onto a reel 22, which is fixed on a rack 26 which moves by means of wheels 24 for the storage of carriages 16 when they are not in use, and for positioning them at one end of a growing bed 6. The rack 26 for this purpose comprises supports 28 which are fitted in the rack 26 in such a way that the top edges of the supports 28 connect at one end to the top edges of the side boards 12. In order to prevent the line 20 from coming into contact with the growing bed 6 or the mushrooms 8, it is preferably guided along the side boards 12.

Figure 2:
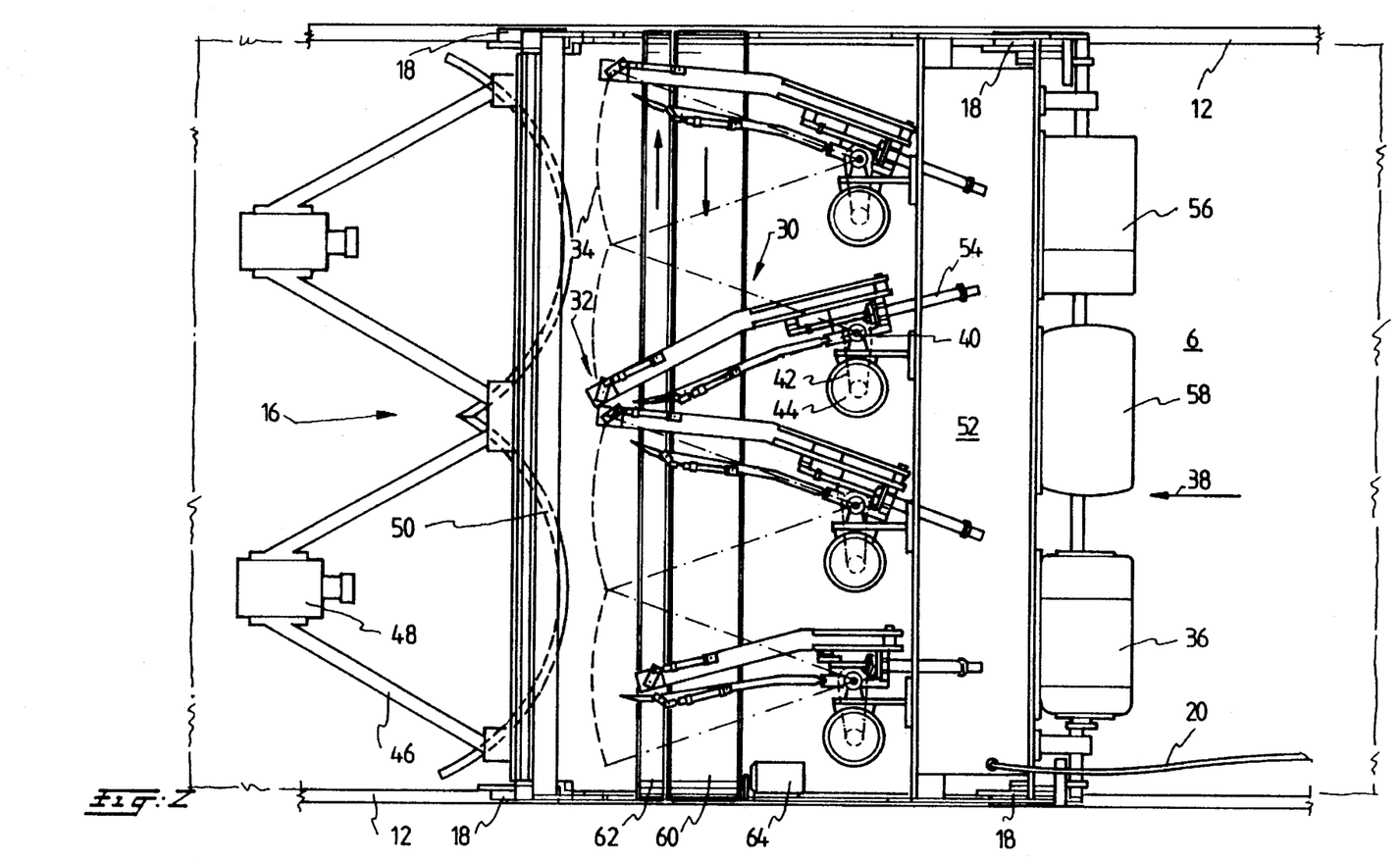
FIG. 2 shows a top view of one of the devices of FIG. 1.

FIG. 2 shows the carriage 16 in greater detail. Fitted next to one another on the carriage 16, at right angles to its direction of movement, are four picking arms 30, one end 32 of which can be moved along a circular arc-shaped path 34. In this way virtually the entire width of the growing bed 6 lying below the carriage 16 can be covered with the ends 32 of the picking arms 30. The carriage 16 is moved along by means of an electric motor 36, which can drive two of the four wheels of the carriage 16 by means of mechanical transmissions in such a way that the carriage moves steadily in the direction of arrow 38 over the growing bed 6, for example at a speed of approximately 0.005 m/s.

Figure 3:
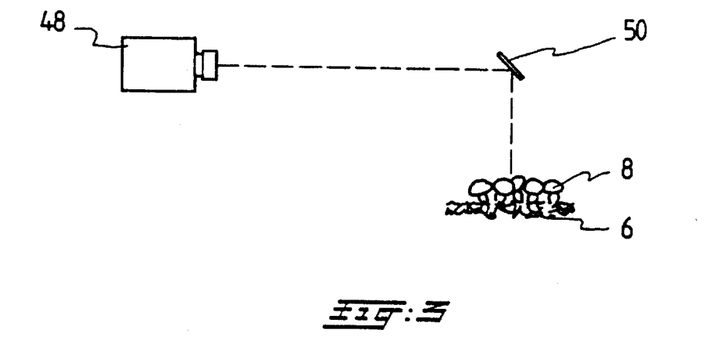
FIG. 3 illustrates the observation of the mushrooms in the growing bed by means of a camera.

The movements of each picking arm 30 within the area bounded by dashed lines take place through the picking arm 30 rotating about a shaft 40. Said shaft is connected by means of a transmission 42, for example two gear wheels and a toothed belt, to a servomotor 44, and can thus be rotated to a certain angular position. Two cameras 48, each designed for optical scanning of half the width of the growing bed 6 during the movement in the direction of the arrow 38, are connected to the frame of the carriage 16 by means of supports 46. As shown in FIG. 2 and schematically in FIG. 3, curved mirrors 50 are set up for this purpose, in line with the camera, at an angle of 45° to the horizontal. An image of the upper side of the growing bed 6 can be obtained with the aid of the cameras 48, the mirrors 50 and a corresponding lighting, following which the positions and the cap diameters of the mushrooms 8 in the growing bed 6 can be established with the aid of the image recognition means described below. The image recognition means are accommodated in a box 52 on the carriage 16 and, following conversion of the image information, produce control signals for driving the servomotors 44.

Figure 6A:
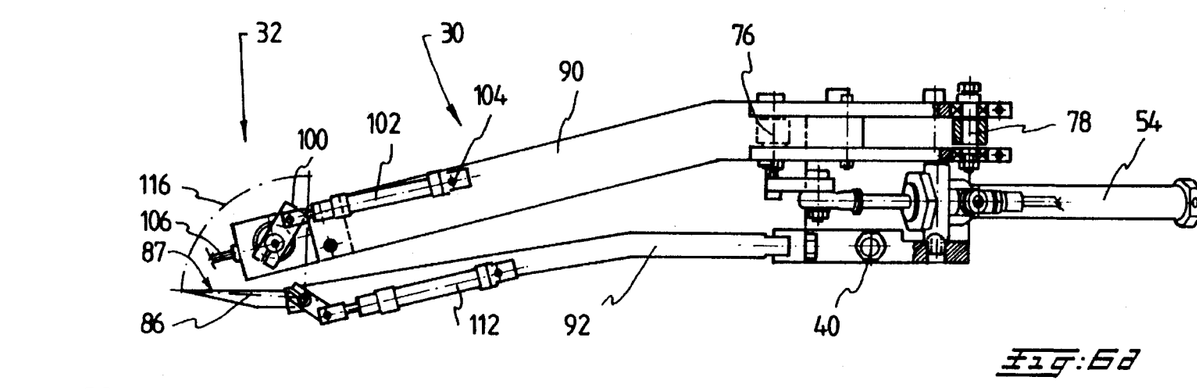
FIG. 6a shows on an enlarged scale a top view, partially in cross-section, of an embodiment of a picking arm and a picking head.
Figure 6B:
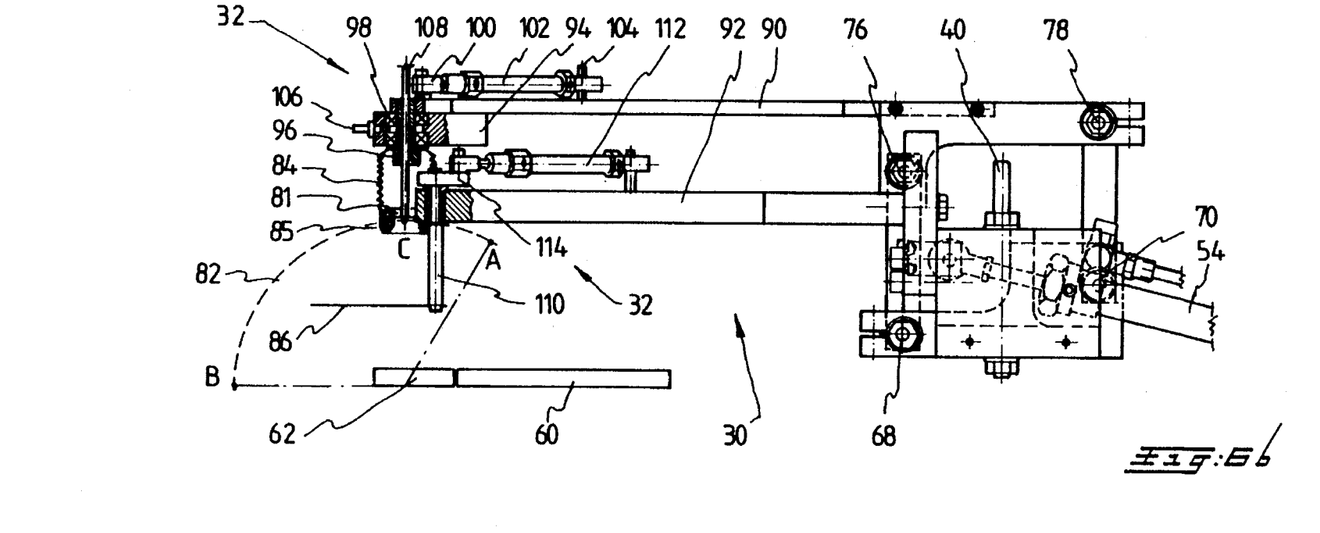

For a movement in a vertical plane, each of the picking arms 30 is driven by a pneumatic double-acting cylinder-piston unit 54, by applying a vacuum at one side of the piston thereof with the aid of valves not described in further detail, and setting the ambient pressure at the other side of said piston. The vacuum needed for controlling the double-acting cylinder-piston unit and other double-acting cylinder-piston units, which will be described below with reference to FIGS. 6a and 6b, is created by pumping the air out of a vacuum tank 58 by means of a vacuum pump 56.

Disposed below the picking arms are two conveyor belts 60 and 62 which can be moved in opposite directions, and which are driven by a motor 64 and suitable mechanical transmissions. The conveyor belt 60 is used for discharging at right angles to the movement direction 38 of the carriage 16 mushrooms which have been harvested by means of the device into boxes 14 along one side of a growing bed 6, and the conveyor belt 62 is intended for discharging in the opposite direction cut-off bases of the stalks of the mushrooms into boxes 14 along the other side of a growing bed 6.

Figure 4:
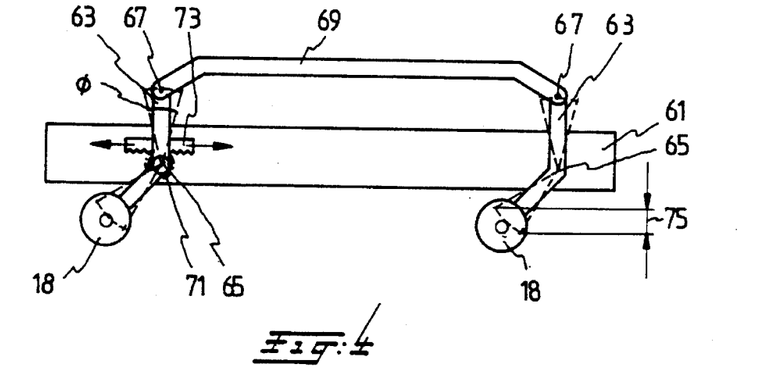
FIG. 4 illustrates a height adjustment of the carriage in side view.

FIG. 4 schematically shows the way in which the frame 61 of a carriage 16 can be adjusted in height relative to the growing bed 6. This may be necessary, since the mushroom harvest lasts a number of weeks, and during this period the growing bed 6 settles through the mushrooms 8 drawing nutrients from it. The flanged wheels 18 are supported on bent bearing arms 63, each of which can pivot relative to the frame 61 about a pivot point 65 in the bend of bearing arms. The ends of the bearing arms 63 facing away from the flanged wheels 18 can be pivoted at one side of the carriage about pivot points 67 coupled to each other by means of a coupling rod 69. A gear wheel 71 is firmly fixed to one of the two bearing arms 63 mechanically coupled in this way, in the pivot point 65 of the bearing arm. The gear wheel 71 can be rotated by means of linear displacement of a rack 73 through a certain angle $\phi$, and thus produces a height adjustment 75 of the carriage 16 relative to the growing bed, i.e. the side boards 12 along the edges of which the carriage is being moved.

Figure 5:
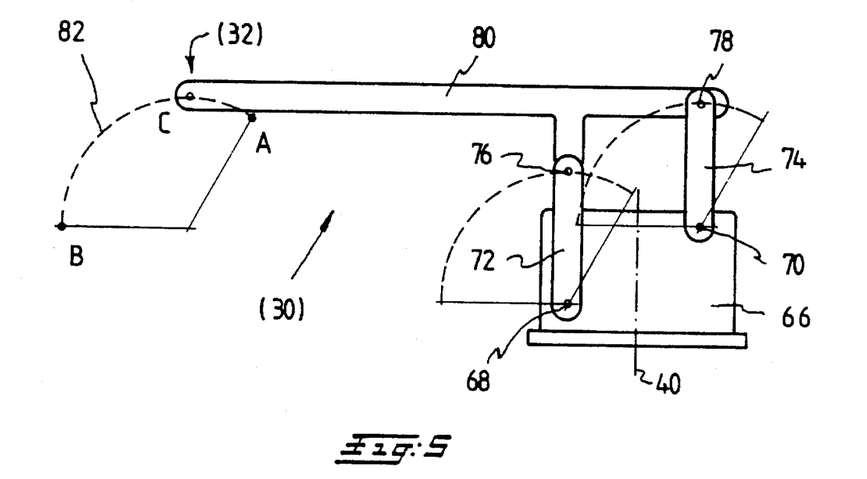
FIG. 5 shows the principle construction and the mode of operation of a picking arm in side view.

A picking arm 30 comprises in principle a four-bar mechanism of the type shown schematically in FIG. 5. Here element 66 symbolizes a part of the frame of the carriage 16 on which two rods 72, 74 are fixed by one end in such a way that they pivot in pivot points 68 and 70, respectively. The other end of the rods 72 and 74 is attached, pivoting about pivot points 76 and 78 respectively, to a rod 80, the end 32 of which bears a picking head. The drive of the picking arm 30 is such that the end 32 of the picking arm 30 describes a path 82 the shape of an arc of a circle in a vertical plane, which arc of a circle is approximately 120°.

A preferred embodiment of the picking arm 30 on the basis of the principle shown in FIG. 5 is shown in FIGS. 6a and 6b, in which corresponding pivot points are indicated by the same reference numeral.

Figure 7:
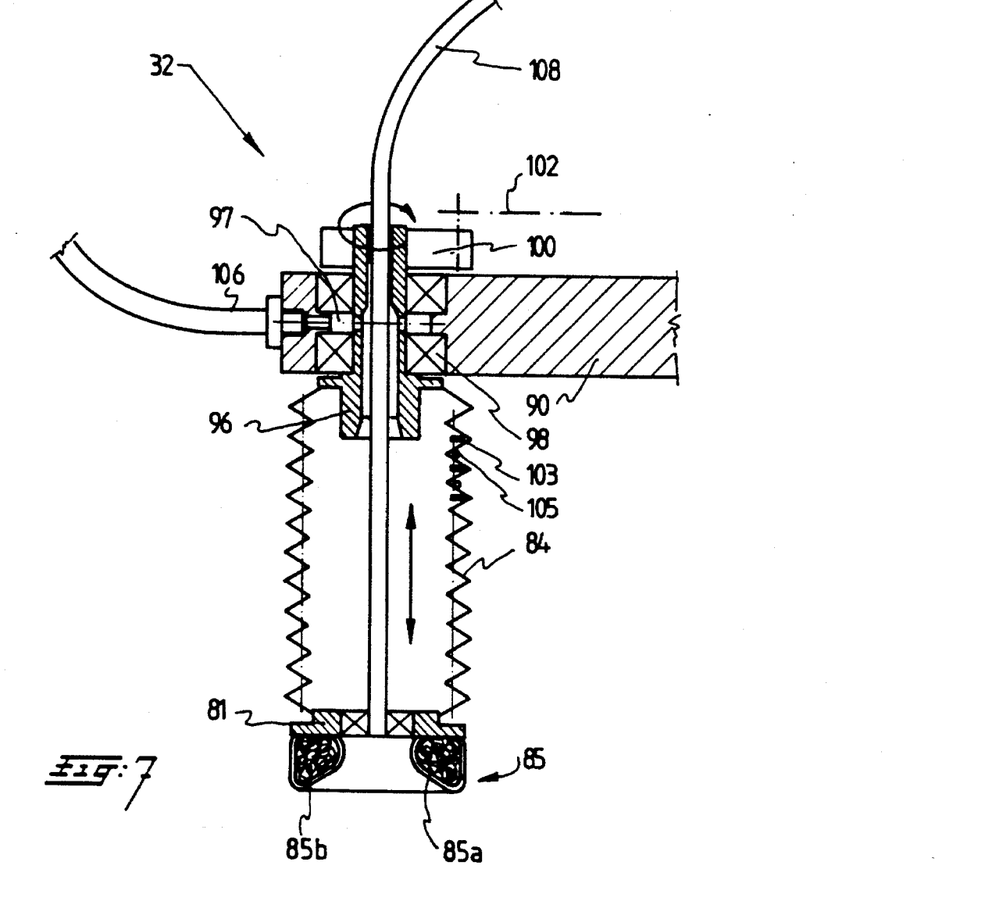
FIG. 7 shows a cross-section of the picking head according to FIG. 6b on an enlarged scale, and in greater detail.

The rod 80 of FIG. 5 in the embodiment of FIGS. 6a and 6b is in the form of bent rods 90 and 92 which are securely interconnected. The rod 90 bears a bearing block 94, in which a sleeve 96 is rotatably mounted by means of bearings 98. Fixed at the top end of the sleeve 96 is a lever 100, one end of which is hingedly connected to one end of the piston rod of a double-acting cylinder-piston unit 102. The cylinder-piston unit 102 is mounted on the rod 90 so that it rotates about a pivot point 104. The sleeve 96 can be rotated by driving the piston of the cylinder-piston unit 102 through a limited angle, for example 90°. A bellows 84 suspended from the sleeve, the design of which bellows is shown on an enlarged scale in FIG. 7, is provided on the underside with a disc 81 with a resilient, rounded annular pad 85 below it, and can be brought to reduced pressure relative to the environment by extracting the air from it through radial holes 97 in the wall of the sleeve 96, and a vacuum line 106. In addition, the space which is enclosed by disc 81 and the pad 85 can also be brought to reduced pressure relative to the environment by extraction of the air out of it through a vacuum line 108 passed through the sleeve. The pad 85 consists of an envelope 85a made of a flexible material, filled with a deformable material 85b, e.g. a resilient material with an open cell structure.

A shaft 110 is supported so that it pivots in a hole in the end of the bar 92. The pivoting movement of the shaft 110 can be carried out by driving the piston of a cylinder-piston unit 112, the piston rod of which is hinged to a lever 114 fixed on the shaft 110. Fixed at the bottom end of the shaft 110 is a cutter 86, the sharp side 87 of which can be moved under the pad 85 of the bellows 84 through an angle of about 90° when the pivoting movement of the shaft 110 described above takes place, as indicated by the dashed line 116 indicating the path of the point of the cutter 86 during the pivoting movement.

FIG. 7 shows internal and external reinforcements 103, 105 respectively in the folds of the bellows 84. These reinforcements, for example consisting of metal rings, ensure that a turning of the sleeve 96 produced by the cylinder-piston unit 102 by means of lever 100 also results in the same amount of turn of the pad 85 of the bellows 84, in other words, the reinforcements 103, 105 make the bellows 84 torsionally more rigid.

The design of the mushroom harvesting device according to the invention and the way in which it operates are further illustrated with reference to FIGS. 2, 6b, 7 and 8(a–f). From an image of the top side of the mushrooms 8 in the growing bed 6, taken line by line by the cameras 48 via the mirrors 50, the image recognition means determine where and when a certain picking arm 30 has to pick a mushroom from the growing bed 6.

This takes place as follows. The image made up of lines taken by the cameras 48 is digitized by means of a computer and stored in a buffer. The contents of said buffer have new data added to them continuously during the movement of the carriage 16 over the growing bed 6, data already interpreted is being removed from the buffer. The data present in the buffer in fact indicate light intensity levels. A high light intensity at a certain point indicates the presence of a mushroom, while a low light intensity at a certain point indicates the detection of the growing bed. The image analysis means first of all select a principally arbitrary point with a high light intensity, which point will be on the cap of a mushroom. From this point along lines in different directions the intersection points of said lines with the contour of the mushroom cap in question are then determined by searching on these lines for a transition from a high to a low light intensity. This results in a collection of points, following which an attempt is made to fit a circle as well as possible along these points. If this is successful, a mushroom with a cap size approximately the same as the size of the circle is found. If this size falls within the limits set for mushrooms which can be picked, the center point of the circle indicates the position for the picking head of the mushroom. On the basis of these data, determined for all mushrooms visible in the image, the picking arms 30 can be controlled adequately.

Figure 8A:
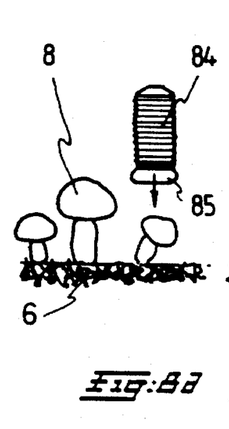
FIGS. 8a–8f illustrate successive stages of picking of a mushroom growing crooked with the aid of the picking head of FIG. 7.
Figure 8B:
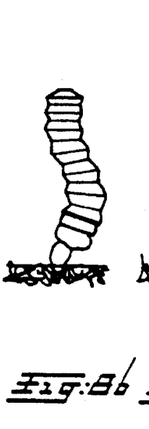
Figure 8C:
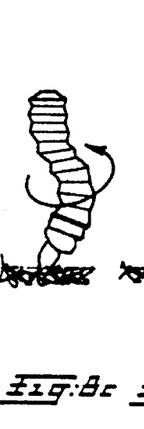
Figures 8D, 8E, 8F:
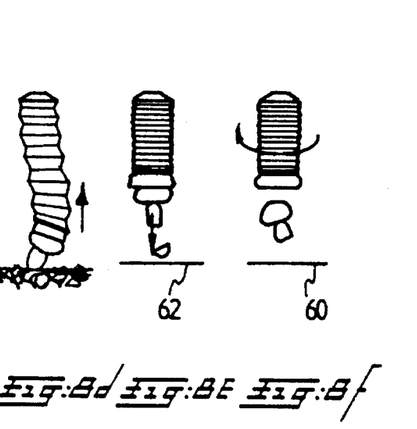

The picking arm 30 in question is first of all, prior to picking, placed by means of the servomotor 44 coupled thereto in the correct angular position, in which the end of picking arm 30, more particularly the center of the pad 85, is in an initial position A, produced by cylinder-piston unit 54. The bellows 84 is retracted by means of the vacuum line 106. When it has reached the mushroom to be picked, the center of the pad 85 is taken into a position B above the cap of the mushroom to be picked by extending the piston rod of the cylinder-piston unit 54 for moving the picking arm 30 in a vertical plane. This is illustrated in FIG. 8*a*. Air at ambient pressure is then admitted to the bellows 84, so that the length of the bellows increases as a result of the force of gravity to such an extent that the underside of the pad 85 rests on the cap of the mushroom to be picked; this is shown in FIG. 8*b*. The laterally flexible bellows 84 allow the pad 85 to adapt its orientation to the orientation of the cap of the mushroom growing crooked. The next step is the evacuation of the vacuum line 108, so that the cap of the mushroom to be picked is held by suction against the pad 85. A rotation of the bellows 84 through extension of the piston of the cylinder-piston unit 102 now results in the same twisting of the mushroom to be picked, with the result that the mycelium filaments connecting the mushroom to the growing bed 6 snap. This last operation is shown symbolically in FIG. 8*c*. Thereafter the space inside the bellows is brought to reduced pressure by means of vacuum line 106, with the result that the length of the bellows decreases, and the mushroom is lifted out of the growing bed 6. The sliding in of the piston rod of the cylinder-piston unit 54 then ensures that the end 32 of the picking arm 30 describes a path 82 from position B to position A. While this path is being passed through, in a position C, the cutter 86 is moved by means of the cylinder-piston unit 112 quickly through under the bellows 84 at such a height that the base of the stalk of the mushrooms is cut off in the process. This is shown symbolically in FIG. 8*e*. After cutting off, the base falls onto conveyor belt 62 and is discharged and collected in a box 14. Finally, the cutter 86 is returned to the initial position shown in FIG. 6*a*, the bellows 84 is also turned back to the initial position shown in FIG. 6*a* (shown symbolically in FIG. 8*f*), and the picked mushroom, on reaching the position A of the end 32 of the picking arm 30, is released above the conveyor belt 60 through the admission of air at ambient pressure inside the pad 85, and is discharged by said conveyor belt and collected in a box 14. Then the picking arm 30 is ready for picking a next mushroom.

We claim:

1. A device for the automatic selective harvesting of mushrooms grown on a growing bed, comprising:
   at least one camera for observing the mushrooms on the growing bed;
   a carrier which is movable above the growing bed relative thereto, and is provided with positioning means for positioning one or more picking heads for picking the mushrooms on the basis of information coming from each camera;
   the picking heads each having a deformable suction cup which is connected to a controllable source of reduced pressure for fixing by suction the cap of a mushroom against the suction cup, each suction cup being rotatable through a certain angle for detaching the mushroom held by suction on the suction cup from the growing bed, wherein the picking head comprises a torsionally essentially rigid, laterally flexible coupling member for interconnecting the suction cup with the positioning means.

2. A mushroom harvesting device according to claim 1, wherein the coupling member consists of a bellows.

3. A mushroom harvesting device according to claim 2, comprising reinforcements in the folds of the bellows.

4. A mushroom harvesting device according to claim 2, wherein the space enclosed by the coupling member is adapted to be connected to a source of reduced pressure.

5. A mushroom harvesting device according to claim 1, wehrein the coupling member consists of a helical spring.

6. A mushroom harvesting device according to claim 5, wherein the helical spring is integrated with a tube made of a flexible material.

7. A mushroom harvesting device according to claim 1, wherein the suction cup has an annular pad consisting at least partially of a flexible envelope filled with a deformable filling material.

8. A mushroom harvesting device according to claim 7, wherein the filling material is resilient porous material with an open cell structure.

9. A mushroom harvesting device according to claim 7, wherein the filling material is a granular material.

10. A mushroom harvesting device according to claim 7, wherein the filling material is an electro-viscous material.

11. A mushroom harvesting device according to claim 7, wherein the annular pad at the side facing the cap of the mushroom is rounded, the radius of the cross-section at the interior side being larger than the radius of the cross-section at the exterior Side.

12. A mushroom harvesting device according to claim 1, wherein the positioning means comprises one or more picking arms, one end of which bears the picking head, which can be moved by the picking arm both in a horizontal plane, essentially transversely to the direction of movement of the carrier relative to the growing bed, and in a vertical plane between an initial position and a picking position between which positions a cutting device for cutting off a base of a stalk of a picked mushroom.

13. A mushroom harvesting device according to claim 12, wherein a picking arm forms part of a four-rod mechanism set up in a vertical place and having four pivot points forming the corner points of a parallelogram, which mechanism can pivot about a vertical shaft through a predetermined angle.

14. A mushroom harvesting device according to claim 12, wherein the cutting device is fitted near the picking head at the end of the picking arm.

15. A mushroom harvesting device according to claim 12, wherein the cutting device comprises an elongated cutter which can be moved in a horizontal plane through a predetermined angle about one end of the cutter.

16. A mushroom harvesting device according to claim 12, comprising means for moving the carrier relative to the growing bed, the camera(s) being coupled to the carrier.

17. A mushroom harvesting device according to claim 16, wherein each camera is disposed horizontally and, by means of a mirror fixed at an angle of 45 degrees relative to the horizontal plane on the carrier, scans the growing bed line by line at right angles to the direction of movement of the carrier relative to the growing bed, for positioning of the picking head(s).

18. A mushroom harvesting device according to claim 12, comprising a conveyor belt disposed below the picking head of a picking arm in its initial position, for the discharge of harvested mushrooms at right angles to the direction of movement of the carrier relative to the growing bed.

19. A mushroom harvesting device according to claim 12, comprising a conveyor belt disposed below the picking head of a picking arm in a base cutting position thereof, for the discharge of the stalk bases cut off the mushrooms at right angles to the direction of movement of the carrier relative to the growing bed.

20. A mushroom harvesting device according to claim 12, wherein the picking arm is bent in a horizontal plane.

21. A picking head comprising a deformable suction cup which is connected to a controllable source of reduced pressure, and a torsionally essentially rigid, laterally flexible coupling member for interconnecting the suction cup with a positioning means.

22. A positioning means, comprising at least one picking arm, one end of which bears a picking head comprising a torsionally essentially rigid, laterally flexible coupling member, which can be moved by the picking arm both in a horizontal plane essentially transversely to a direction of movement of a carrier relative to a growing bed, and in a vertical plane between an initial position and a picking position.

* * * * *